United States Patent [19]

Umezawa

[11] 4,388,627

[45] Jun. 14, 1983

[54] INK-JET PRINTING HEAD

[75] Inventor: Michio Umezawa, Kawasaki, Japan

[73] Assignee: Ricoh Co., Ltd., Tokyo, Japan

[21] Appl. No.: 331,688

[22] Filed: Dec. 17, 1981

[30] Foreign Application Priority Data

Dec. 27, 1980 [JP] Japan ................................ 55-185034

[51] Int. Cl.[3] ........................ G01D 15/18; B05B 17/06

[52] U.S. Cl. ........................................ 346/75; 239/102

[58] Field of Search .......................... 346/1.1, 75, 140; 239/102

[56] References Cited

U.S. PATENT DOCUMENTS

| | | | |
|---|---|---|---|
| 2,512,743 | 6/1950 | Hansell | 239/102 X |
| 3,281,860 | 10/1966 | Adams et al. | 239/102 X |
| 3,708,118 | 1/1973 | Keur | 239/102 X |
| 3,972,474 | 8/1976 | Keur | 346/75 X |
| 4,356,499 | 10/1982 | Kodama | 346/75 |

*Primary Examiner*—Donald A. Griffin

*Attorney, Agent, or Firm*—Burgess, Ryan and Wayne

[57] ABSTRACT

In an ink-jet printing head of the type in which the front end of an ink distribution tube is formed with a nozzle hole and the rear end thereof is terminated into a spigot and inserted into one end of the ink supply tube and rigidly connected thereto, a resonance adjusting means has an ink passage of a fine diameter extended therethrough in the axial direction thereof and is inserted into the spigot end portion of the ink distribution tube in such a way that the front end of the resonance adjusting means is spaced apart from the front end with the nozzle hole of the ink distribution tube by a distance equal to a resonance distance, at which the ink in the ink distribution tube is resonated, and thereafter rigidly and liquid-tightly connected to the spigot end portion.

5 Claims, 9 Drawing Figures

INK-JET PRINTING HEAD

BACKGROUND OF THE INVENTION

The present invention relates to generally an ink-jet printing head and more particularly an ink-jet printing head of the type in which the length between a nozzle hole at one end of an ink distribution tube and an ink inlet at the other end thereof (to be referred to as "a resonant distance" for brevity in this specification at which the ink in the ink manifold is resonated) can be adjusted by adjusting the position of a reflecting plate disposed adjacent to the ink inlet.

In general, the bell-and-spigot joint has been used for connecting the ink manifold to an ink supply tube. In some cases, a resonance adjusting tube is interconnected between the ink distribution tube and the ink supply tube and a reflecting plate or the like with a center ink passage hole is inserted into the resonance adjusting tube from its end to be connected to the ink supply tube. The distance between the nozzle hole of the ink manifold and the ink passage hole of the reflecting plate is a resonance distance. The fine adjustment of the resonance distance is made by cutting off the resonance adjusting tube. This means two steps must be carried out alternately. That is, in a first step, an error between a predetermined resonance distance and an overall axial length of the ink distribution tube and the resonance adjusting tube must be measured and in a second step, the resonance adjusting tube must be cut off so that the overall axial length becomes equal to the resonance distance. Therefore, the assembly of ink-jet printing heads is time-consuming and cumbersome. In addition, if an error is negative; that is, if an overall axial length is shorter than a predetermined resonance distance, a short resonance adjusting tube must be discarded with the resultant decrease in yield. Futhermore, two steps must be added for liquid-tightly sealing the joints between the ink distribution tube and the resonance adjusting tube and between the resonance adjusting tube and the ink supply tube. Thus, the prior art ink-jet printing head needs many component parts and many assembly steps and is, therefore, expensive in cost.

SUMMARY OF THE INVENTION

One of the objects of the present invention is to provide an ink-jet printing head which can be fabricated with a minimum number of component parts, a minimum number of fabrication steps and with a high yield.

To this end, according to one embodiment of the present invention, one end of an ink distribution tube is formed with a nozzle hole and the other end thereof is terminated into a spigot. A resonance adjusting member is in the form of a cylinder and has an ink passage extended therethrough in the axial direction. The resonance adjusting member is inserted into the spigot of the ink distribution tube in such a way that one or inner end; that is, the inserted end of the resonance adjustng member is spaced apart from the nozzle hole at the leading end of the ink distribution tube by a distance equal to a predetermined resonance distance. Thereafter, the resonance adjusting member and the spigot of the ink distribution tube are securely connected to each other.

As a result, simultaneously can be accomplished the step for measuring an error or adjusting the spacing between the nozzle hole and the inner end of the resonance adjusting member and the step for securely connecting the resonance adjusting member to the spigot of the ink distribution tube. Therefore, the step for determining the position of the resonance adjusting member relative to the nozzle hole of the ink distribution tube and securely maintaining it in the adjusting position can be much simplified and accomplished within a short time. In addition, in the step of determining the position of the resonance adjusting member, it can be displaced in the axial direction toward or away from the nozzle hole of the ink manifold. Therefore, either positive or negative errors can be eliminated without discarding the resonance adjusting member so that a high production yield can be attained.

Another object of the present invention is to provide an ink-jet printing head in which the spigot of the ink manifold can be directly connected by one step to the ink supply tube, whereby the numbers of component parts and fabrication steps can be reduced to a minimum and consequently the production costs can be lowered.

A further object of the present invention is to provide an ink-jet printing head which can exhibit stable ink-drop-generation characteristics; that is, which is highly reliable and dependable in operation.

To this end, according to another embodiment of the present invention, the ink passage extended through the resonance adjusting member is inclined at an angle to the axis of the latter. Alternately, the ink passage is cranked. As a result, damping of vibration energy externally applied to the ink in the ink distribution tube can be minimized. In addition, the transmission of undesired pulsation in the ink in the supply tube to the ink distribution tube can be almost avoided. Thus, the ink-drop generation can be highly stabilized.

BRIEF DESCRIPTION OF THE DRAWINGS

Same reference numerals are used to designate similar parts throughout the figures.

DETAILED DESCRIPTION OF THE PRIOR ART

Figure 1A:
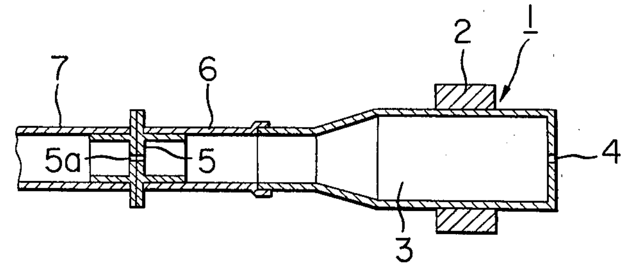
FIG. 1A PRIOR ART
FIG. 1A is a longitudinal sectional view of a prior art ink-jet printing head.
Figure 1B:
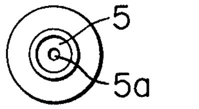
FIG. 1B PRIOR ART
FIG. 1B is a front view of a reflecting plate inserted into a resonance adjusting tube of the head as shown in FIG. 1A.

Referring to FIGS. 1A and 1B, reference numeral 1 denotes an ink drop generator consisting of an ink distribution tube 3 and an electrostrictive element or vibrator 2 mounted on the wall of the ink distribution tube 3. As the electrostrictive element 2 applies synchronizing pressures to the ink in the distribution tube 3, the ink is forced through a nozzle hole 4 formed through one end wall of the ink distribution tube 3. One end of a resonance adjustng tube 6 is connected to the ink distribution tube 3 while the other end thereof is connected through a reflector 5 to one end of an ink supply tube 7 whose other end is connected to an ink supply system (not shown). The reflector 5 has a center aperture 5*a* of a fine diameter so that ink can flow from the supply tube 7 into the resonance adjusting tube 6.

The distance between the reflector 5 and the nozzle hole 4 is so adjusted that the ink in the ink distribution tube 3 and the resonance adjusting tube 6 can resonate at a resonant frequency. Then, the driving voltage applied to the electrostrictive element 2 can be lowered. In addition, the generation of satellite drops can be avoided. As a consequence, the ink drops can be generated under ideal conditions.

In a fabrication step, in order to attain an optimum length or distance between the nozzle hole 4 and the reflector 5, the other end of the resonance adjusting tube 6 is cut off after the optimum resonance distance has been correctly measured. That is, the step for measuring a difference or error of a resonance distance on the one hand and a length between the nozzle hole 4 and the other end of the resonance adjusting tube 6 after the latter has been securely connected to the ink distribution tube 3 and the step for cutting the other end portion of the resonance adjusting tube 6 by a length equal to the measured difference or error must be alternately carried out. Thus, the assembly of the ink drop generator 1 is very difficult and cumbersome. Furthermore, if a measured difference or error is negative; that is, the measured distance is shorter than the optimum resonant distance, the resonance adjusting tube 6 must be discarded, resulting in low production yields. Furthermore, the joints between the ink distribution tube 3, the resonance adjusting tube 6 and the ink supply tube 7 must be liquid-tightly sealed so that the number of fabrication steps is increased, resulting in the inevitable increase in cost.

DETAILED DESCRIPTION OF THE PREFEFERRED EMBODIMENTS

Figure 2A:
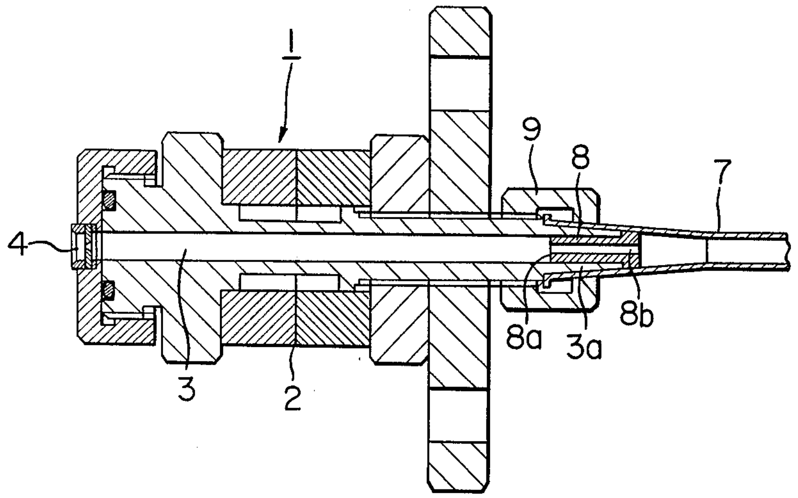
FIG. 2A is a longitudinal sectional view of a first embodiment of the present invention.
Figure 2C:
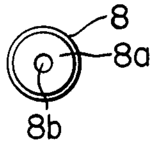
FIG. 2C is an end view of the resonance adjusting member.
Figure 2B:
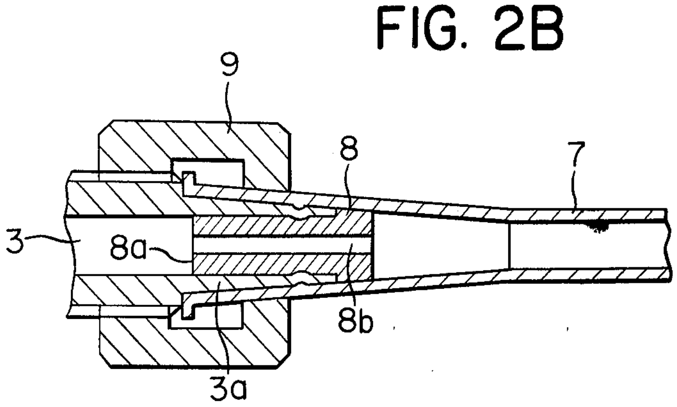
FIG. 2B is a partial view, on enlarged scale, thereof for showing in detail the connections between an ink distribution tube, a resonance adjusting member and an ink supply tube.

Referring next to FIG. 2, an ink drop generator or an ink-jet printing head embodying the present invention comprises an ink distribution tube 3 with a nozzle hole 4 and an electrostrictive element 2. According to the present invention, a cylindrical resonance adjusting member 8 is used which has an ink supply passage 8*b* extended coaxially and over the whole length thereof. One end 8*a* of the resonance adjusting member 8; that is, the inner end inserted into the ink distribution tube 3, acts as a reflecting plate. After the resonance adjusting member 8 is inserted into the ink distribution tube 3, the spigot end 3*a* of the ink distributon tube 3 is inserted into the bell end of the ink supply tube 7 and the ink distribution tube 3 and the ink supply tube 7 are connected with a nut 9.

In assembly, the resonance adjusting member 8 is inserted into the spigot portion 3*a* of the ink distribution tube 3 in such a way that the distance between the reflecting end 8*a* of the resonance adjusting member 8 and the nozzle hole 4 of the ink distribution tube 3 becomes precisely equal to a resonance distance. Thereafter, the spigot end portion 3*a* is pressed against the resonance adjusting member 8 so that the latter may be securely held in position. Next, the spigot end portion 3*a* with the inserted resonance adjusting member 8 is inserted into the bell end portion of the ink supply tube 7 and the nut 9 is suitably torqued, whereby the ink-jet printing head 1 is securely connected to the ink supply tube 7. Next, the joint between the ink distribution tube 3 and the ink supply tube 7 is suitably sealed. Alternatively, a suitable sealing means can be interposed between the spigot end portion 3*a* and the bell end portion of the ink supply tube 7 before the nut 9 is tightened.

Figure 3A:
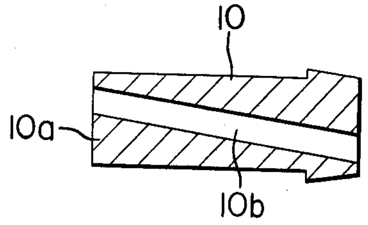
FIG. 3A is a longitudinal sectional view of a resonance adjusting member used in a second embodiment of the present invention.
Figure 3B:
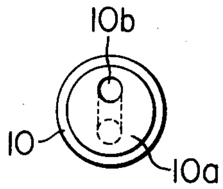
FIG. 3B is an end view thereof.

A second embodiment of the present invention next will be described with reference to FIG. 3. As with the first embodiment, the inner end 10*a* of a cylindrical resonance adjusting member 10 acts as a reflecting plate, but an ink passage 10*b* is inclined relative to the axis of the resonance adjusting member 10 as best shown in FIG. 3A. Therefore, the axis of the ink passage 10*b* is offset from the direction of vibration of ink in the ink distribution tube 3 so that the transmission of ink vibration in the ink distribution tube 3 to the ink supply tube 7 can be minimized. In addition, undesired pulsations of ink in the ink supply tube 7 can be prevented to be transmitted to the ink in the distribution tube 3. In consequence, the ink drop generation can be satisfactorily stabilized.

Figure 4A:
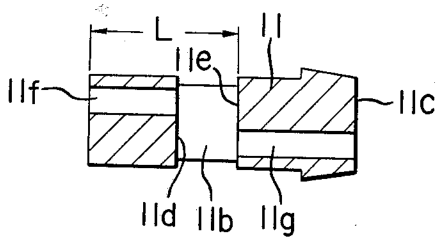
FIG. 4A is a longitudinal sectional view of a resonance adjusting member used in a third embodiment of the present invention.

Referring next to FIG. 4, a third embodiment of the present invention will be described. As with the first or second embodiment, the inner end 11*a* of a cylindrical resonance adjusting member 11 acts as a reflecting plate. The resonance adjusting member 11 has an ink chamber 11*b* defined at the center portion.

Figure 4B:
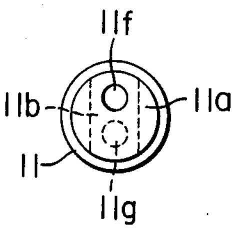
FIG. 4B is an end view thereof.

The front and rear walls 11*d* and 11*e* of the ink chamber 11*b* are perpendicular to the axis of the resonance adjusting member 11 and in parallel with each other and the end face 11*a*. A first ink passage 11*f* is extended from the ink chamber 11*b* to the front end 11*a* and a second ink passage 11*g* is extended through the resonance adjusting member from the rear end 11*c* to the ink chamber 11*b*. The axes of the first and second ink passages 11*f* and 11*g* are in parallel with the axis of the resonance adjusting member 11, but are offset from each other and from the axis of the member 11 as well as best shown in FIG. 4B. The length L between the front end 11*a* and the rear wall 11*e* of the ink chamber 11*b* is equal to a resonance distance. Therefore, the waves which propagate downstream through the first ink passage 11*f* are reflected back from the rear wall surface 11*e* of the ink chamber 11*b* to travel back into the ink chamber in the distribution tube 3. As a result, the loss of the energy of vibration of the ink can be minimized. In addition, undesired pulsations of the ink in the ink supply tube 7 are reflected back from the front wall 11*d* of the ink chamber 11*b* so that they are prevented from being transmitted to the ink distribution tube 3. Therefore, the ink drop generation can be optimumly stabilized.

What is claimed is:

1. An ink-jet printing head of the type in which the front end of an ink distribution tube is formed with a nozzle hole and the other end or spigot end portion thereof is inserted into one end of an ink supply tube and then joined rigidly and liquid-tightly thereto, characterized in that a resonance adjusting means has an ink passage which has a fine diameter and which is extended through said resonance adjusting means in the axial direction thereof, and said resonance adjusting means is inserted into said other end of spigot end portion of said ink distribution tube in such a way that the front end of said resonance adjusting means is spaced apart from said nozzle hole at said one end of said ink distribution tube by a distance equal to a resonance distance of ink in said ink distribution tube and thereafter is securely joined to said the other end of spigot end portion.

2. An ink-jet printing head as set forth in claim 1 further characterized in that the axis of said ink passage is inclined at an angle with respect to the axis of said resonanace adjusting means.

3. An ink-jet printing head as set forth in claim 1 further characterized in that said ink passage is zig-zaged or bent or cranked.

4. An ink-jet printing head as set forth in claim 3 further characterized in that said zig-zaged or bent ink passage comprises (a) an ink chamber defined in said resonance adjusting means at a center portion intermediate the ends thereof in such a way that both the front and rear walls of said ink chamber are perpendicular to the axis of said resonance adjusting means and in parallel with the end faces thereof and with each other, (b) a first ink passage extended in parallel with the axis of said resonance adjusting means from said one end thereof to said front end of said ink chamber, the axis of said first ink passage being offset from that of said resonance adjusting means, and (c) a second ink passage extended in parallel with the axis of said resonance adjustng means from said the other end thereof to said rear end of said ink chamber, the axis of said second ink passage being offset from those of said resonace adjusting means and said first ink passage whereby said first and second ink passages are staggered in the radial direction.

5. An ink-jet printing head as set forth in claim 4 further characterized in that the distance between said one end of said resonance adjusting means and said rear wall of said ink chamber is equal to a resonance distance.

* * * * *